United States Patent
Fujii et al.

(10) Patent No.: US 10,358,146 B2
(45) Date of Patent: Jul. 23, 2019

(54) DISPLAY CONTROL SYSTEM, DISPLAY SYSTEM, MOVABLE-BODY APPARATUS, DISPLAY CONTROLLING METHOD, AND STORAGE MEDIUM

(71) Applicant: Panasonic Intellectual Property Management Co., Ltd., Osaka (JP)

(72) Inventors: Shigeki Fujii, Osaka (JP); Koumei Kubota, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/019,689

(22) Filed: Jun. 27, 2018

(65) Prior Publication Data

US 2019/0009796 A1    Jan. 10, 2019

(30) Foreign Application Priority Data

Jul. 4, 2017   (JP) ................................ 2017-131527

(51) Int. Cl.
| | |
|---|---|
| *B60Q 1/00* | (2006.01) |
| *B60W 50/14* | (2012.01) |
| *B60K 28/02* | (2006.01) |
| *B60W 40/08* | (2012.01) |
| *G06F 1/16* | (2006.01) |
| *B60K 35/00* | (2006.01) |

(52) U.S. Cl.
CPC ............ *B60W 50/14* (2013.01); *B60K 28/02* (2013.01); *B60K 35/00* (2013.01); *B60W 40/08* (2013.01); *G06F 1/1647* (2013.01); *B60K 2350/1068* (2013.01); *B60W 2050/143* (2013.01); *B60W 2050/146* (2013.01)

(58) Field of Classification Search
CPC ............ B60W 50/14; B60W 1/00; G01T 1/60
USPC .................. 340/461, 438, 439; 345/520, 545
See application file for complete search history.

(56) References Cited

U.S. PATENT DOCUMENTS

| | | | |
|---|---|---|---|
| 2008/0211654 A1* | 9/2008 | Kasamatsu | B60K 35/00 340/461 |
| 2014/0225725 A1 | 8/2014 | Takahashi et al. | |
| 2015/0302820 A1* | 10/2015 | Ishiguro | G06F 9/4843 345/520 |
| 2016/0311323 A1* | 10/2016 | Lee | B60K 37/06 |
| 2018/0023970 A1* | 1/2018 | Iguchi | B60K 35/00 345/7 |

FOREIGN PATENT DOCUMENTS

WO    2013/051307    4/2013

* cited by examiner

*Primary Examiner* — Tai T Nguyen
(74) *Attorney, Agent, or Firm* — Greenblum & Bernstein, P.L.C.

(57) ABSTRACT

A display control system includes a display controller, and a single virtual frame-memory. The display controller controls a plurality of display devices physically separated from each other. The virtual frame-memory stores one or more screen images to be displayed on the plurality of the display devices. The display controller is configured to write, into the virtual frame-memory, a screen image to be displayed on and across at least two of the plurality of the display devices.

12 Claims, 9 Drawing Sheets

DISPLAY CONTROL SYSTEM, DISPLAY SYSTEM, MOVABLE-BODY APPARATUS, DISPLAY CONTROLLING METHOD, AND STORAGE MEDIUM

BACKGROUND

1. Technical Field

The present disclosure relates to a display control system, a display system, a movable-body apparatus, a display controlling method, and a storage medium, for controlling a plurality of display devices which are physically separated from each other.

2. Description of the Related Art

A warning device has conventionally been proposed which is to urge a driver to stop looking aside while driving, i.e. to stop inattentive driving. Such a warning device works as follows: When the device detects that a driver looks aside to the left while driving, the device causes a first warning light either to go on or to flash. The first warning light is disposed in a left-side windshield pillar. Moreover, when the device detects that the driver looks aside to the right while driving, the device causes a second warning light either to go on or to flash. The second warning light is disposed in a right-side windshield pillar. In accordance with the warning device, the going-on or flashing of the first or second warning light in response to the inattentive driving by the driver allows the driver to easily become conscious of the own inattentive driving thereby.

SUMMARY

The present disclosure provides a display control system, a display system, a movable-body apparatus, a display controlling method, and a non-temporary storage medium storing a program which are capable of causing a plurality of display devices to cooperate with each other to display a single piece of information on the display devices physically separated from each other.

A display control system according to an aspect of the present disclosure includes a display controller, and a single virtual frame-memory. The display controller controls a plurality of display devices that are physically separated from each other. The virtual frame-memory stores one or more screen images to be displayed on the plurality of the display devices. The display controller is configured to write, into the virtual frame-memory, a screen image to be displayed on and across at least two of the plurality of the display devices. The screen image is included in the one or more screen images.

A display system according to an aspect of the present disclosure includes the display control system described above, and a plurality of the display devices.

A movable-body apparatus according to an aspect of the present disclosure includes the display system described above, and a body in which the display system is mounted.

A display controlling method according to an aspect of the present disclosure controls a plurality of the display devices that are physically separated from each other. In the display controlling method, a screen image to be displayed on and across the plurality of the display devices is written into a single virtual frame-memory which stores one or more screen images to be displayed on the plurality of the display devices.

A non-temporary storage medium according to an aspect of the present disclosure stores a program for causing a computer system to execute the display controlling method described above.

In accordance with the present disclosure, it is possible to cause the plurality of the display devices, which are physically separated from each other, to cooperate with each other to display a single piece of information.

DETAILED DESCRIPTION OF PREFERRED EMBODIMENTS

Prior to descriptions of embodiments of the present disclosure, problems of conventional devices will be briefly described. According to the configuration described above, each of a plurality of the indicating devices (first warning light and second warning light) which are physically separated from each other, individually indicates warning (by means of going-on or flashing). That is, the plurality of the indicating devices does not cooperate with each other to indicate single information. For this reason, with this configuration, there are cases where the operation does not achieve a sufficient effect of guiding the line of sight (direction of closely watching) of a driver to the front, for example.

First Exemplary Embodiment

1. Outline

Figure 1:
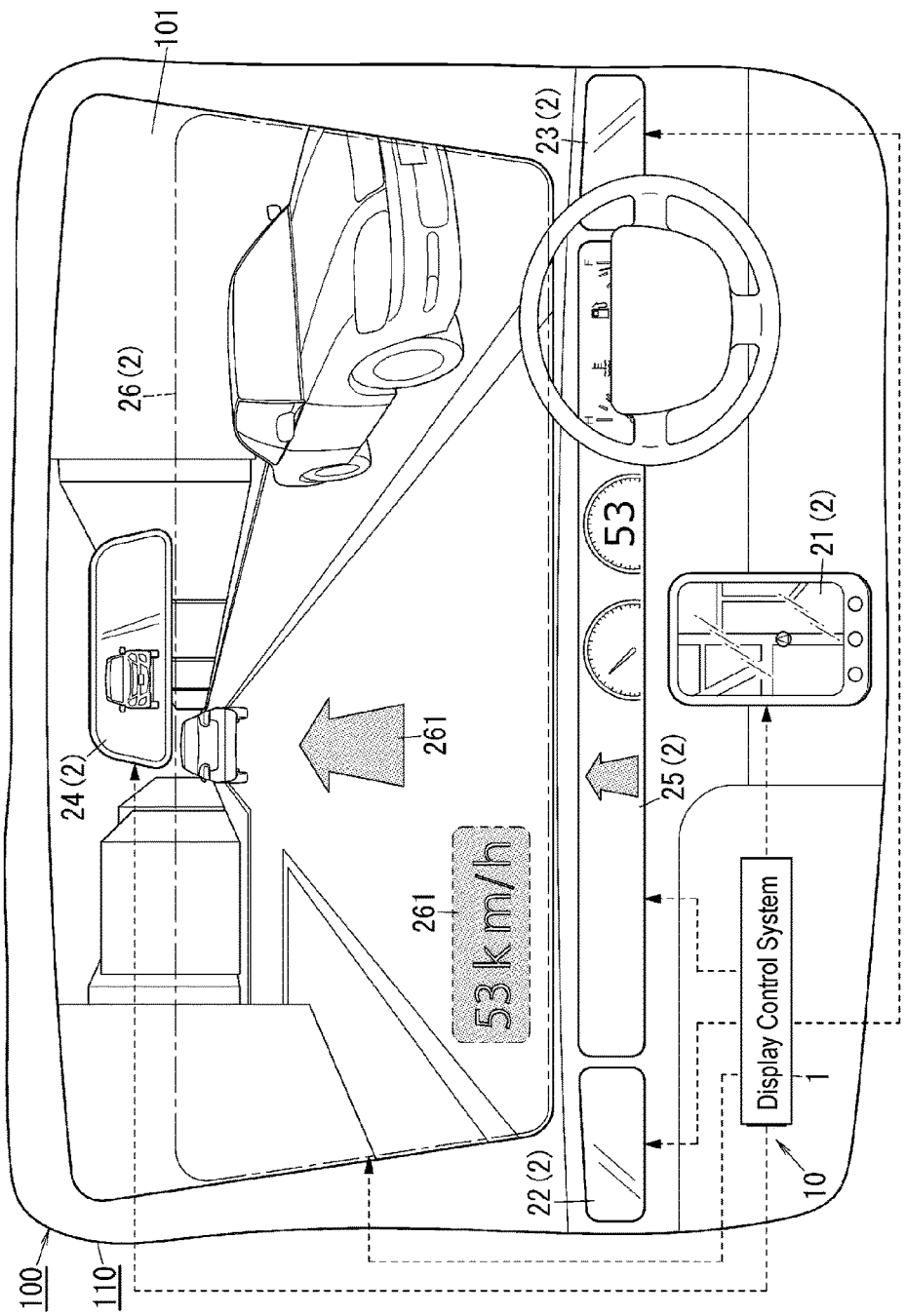
FIG. 1 is a conceptual illustration showing a visual field of a driver in a case where a display control system is used according to a first embodiment of the present disclosure.

Display control system 1 according to the embodiment of the present disclosure controls display devices 21 to 26, as shown in FIG. 1. That is, in this case, display control system 1 controls six units of display devices 2 which are physically separated from each other. Display control system 1, together with display devices 21 to 26, configures display system 10. That is, display system 10 includes display control system 1 and display devices 21 to 26. Hereinafter, in cases where display devices 21 to 26 are not particularly distinguished from each other, each of a plurality of display devices 21 to 26 is simply referred to as "display device 2."

Display system 10 to mounted in body 110 of movable-body apparatus 100 as shown in FIG. 1, for example. For example, movable-body apparatus 100 is an automobile which travels on road surfaces with a passenger being therein. That is, movable-body apparatus 100 includes display system 10 and body 110 to which display system 10 is mounted. Therefore, display devices 21 to 26 included in display system 10 are mounted in single movable-body apparatus 100.

As an example of the embodiment, display device 2 is a display apparatus of equipment mounted in body 110. Such equipment includes a car navigation system, an electronic mirror system, and a multi-information display, or a head-up display (HUD). Specifically, display device 21 is the display apparatus of a car navigation system. Display device 22 is the display apparatus of an electronic mirror system that functions as a left side-view mirror. Display device 23 is the display apparatus of an electronic mirror system that functions as a right side-view mirror. Display device 24 is the display apparatus of an electronic mirror system that functions as a rear-view mirror. Display device 25 is a multi-information display. Display device 26 is a head-up display.

Display device 26 includes a projector which is disposed below windshield 101 (e.g. inside a dashboard) in the interior of movable-body apparatus 100. The projector projects images onto windshield 101. Upon projecting an image onto windshield 101 serving as a reflecting member, the image is reflected off windshield 101 to be visually recognized by driver 120 (see FIG. 2A). That is, in accordance with display device 26, driver 120 visually recognizes virtual image 261 through windshield 101. The virtual image is projected in a space (the outside of the vehicle) ahead of movable-body apparatus 100. The "virtual image" is an image formed by diverging-light rays to be recognized as if the image was a real object. Such light rays are obtained when light emitted from display device 26 is reflected off a reflector such as windshield 101 to diverge. Therefore, driver 120 can see virtual image 261 that is projected by display device 26, such that the virtual image overlaps with a real space that exists ahead of movable-body apparatus 100, as shown in FIG. 1. In the case shown in FIG. 1, virtual images 261 are shown as an example, containing an arrow indicating "straight forward," and information of a vehicle speed of "53 km/h." FIG. 1 is a conceptual illustration showing a visual field of a user. In the illustration, a display area, in which virtual image 261 can be displayed, of display device 26 is indicated as "display device 26."

Display control system 1 causes each of display devices 2 to display various kinds of drive-assist information, thereby allowing driver 120 to visually recognize the thus-displayed information. Such drive-assist information may include: navigation information, a captured image, vehicle speed information, pedestrian information, surrounding vehicle information, lane departure information, and vehicle condition information, for example. The "captured image" is an image that is obtained with a camera to capture surroundings (the outside) of movable-body apparatus 100. That is, display system 10 is capable of presenting driver 120 with various kinds of information by displaying the various kinds of information onto display devices 2 which driver 120 can visually recognize. Note that, in the following descriptions, the "pedestrian information" is information that includes presence of a pedestrian in the surrounding area of movable-body apparatus 100, and the distance to the pedestrian. Like this, the "surrounding vehicle information" is information that includes presence of another vehicle in the surrounding area of movable-body apparatus 100, and the distance to the vehicle. These kinds of information can be detected through use of a detector of an advanced driver assistance system (ADAS) that is mounted to movable-body apparatus 100; the detector is a camera, sonar sensor, radar, light detection and ranging (LiDAR), or the like.

As described above, display control system 1 is capable of not only causing each of display devices 21 to 26 to individually display different pieces of information, but also causing display devices 21 to 26 to cooperate with each other to display a single piece of information. That is, display control system 1 performs centralized control of display devices 21 to 26 which are physically separated from each other, thereby allowing display devices 21 to 26 to display a single piece of information. In other words, display control system 1 can control display devices 21 to 26 as if they were a single display apparatus (display device), thereby causing display devices 21 to 26 to display a screen image that spreads across the display devices.

Figure 4:
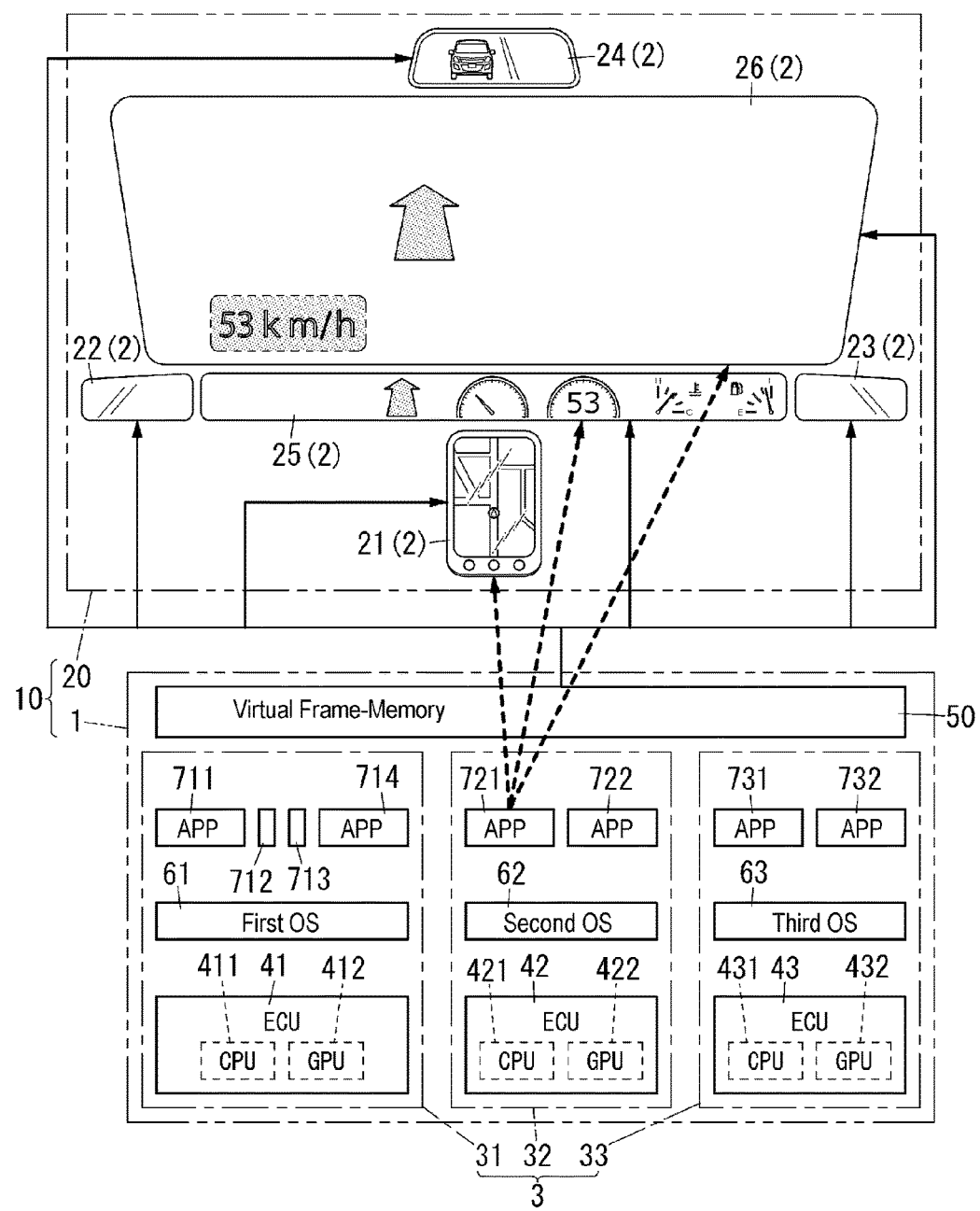
FIG. 4 is another schematic view showing the configuration of: the display control system according to the first embodiment of the present disclosure, and the display system.

To realize the configuration described above, display control system 1 includes display controller 3 and a single virtual frame-memory 50, as shown in FIG. 4. Display controller 3 controls display devices 21 to 26 physically separated from each other. Virtual frame-memory 50 stores one or more screen images to be displayed on display devices 21 to 26. Display controller 3 is configured to write, into virtual frame-memory 50, a screen image to be displayed on and across display devices 21 to 26. Note that it is not always required that the screen image to be displayed on and across display devices 21 to 26 be displayed across all of display devices 21 to 26. That is, the screen image may be displayed on and across at least two of display devices 2 which are classified into different groups, as will be described later.

FIGS. 2A to 2D shows examples of applications of display control system 1 that is configured in this way. In FIGS. 2A to 2D, a situation is assumed in which pedestrian 130 comes ahead of movable-body apparatus 100 while driver 120 is looking at display device 21. Thus, it is necessary to guide the line of sight (direction of closely watching) of driver 120 to pedestrian 130 ahead of movable-body apparatus 100. Whether driver 120 is looking at display device 21 or not can be determined by detecting the direction of the line of sight of driver 120 and the like, through use of a line-of-sight detecting unit of an ADAS and the like, for example.

Figure 2A:
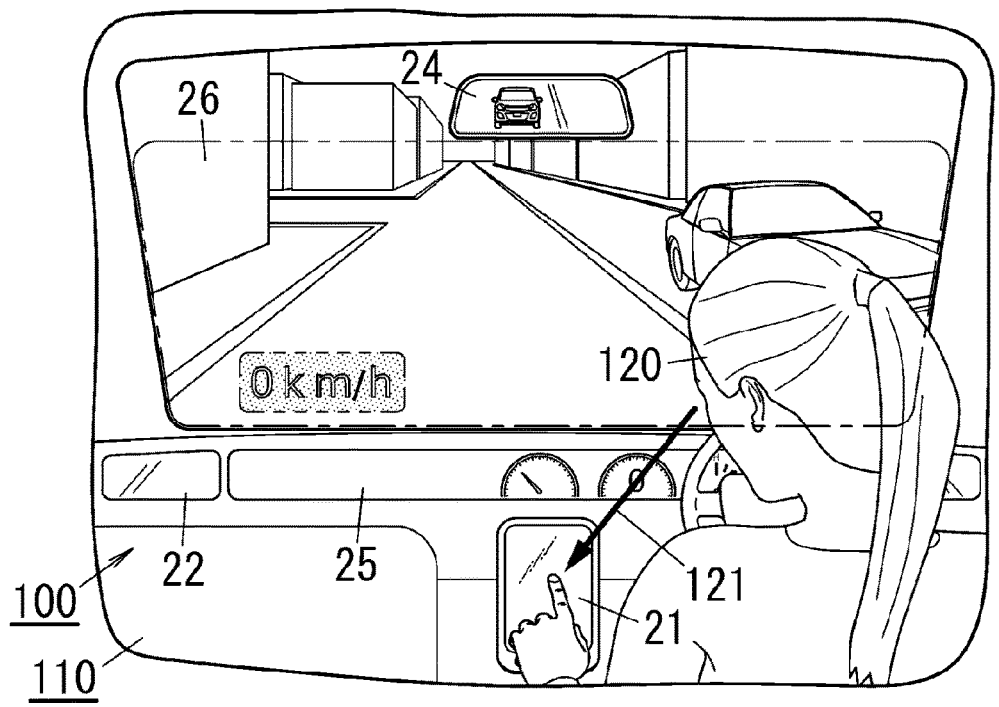
FIGS. 2A to 2D are each a conceptual illustration showing an example of applications of the display control system according to the first embodiment of the present disclosure.

First, as shown in FIG. 2A, in a state in which no pedestrian is present ahead of movable-body apparatus 100, display control system 1 causes display devices 21 to 26 to individually display different screen images. In the state shown in FIG. 2A, driver 120 is looking at display device 21 in order to operate display device 21; therefore, line-of-sight 121 of driver 120 is being directed toward display device 21.

Figure 2B:
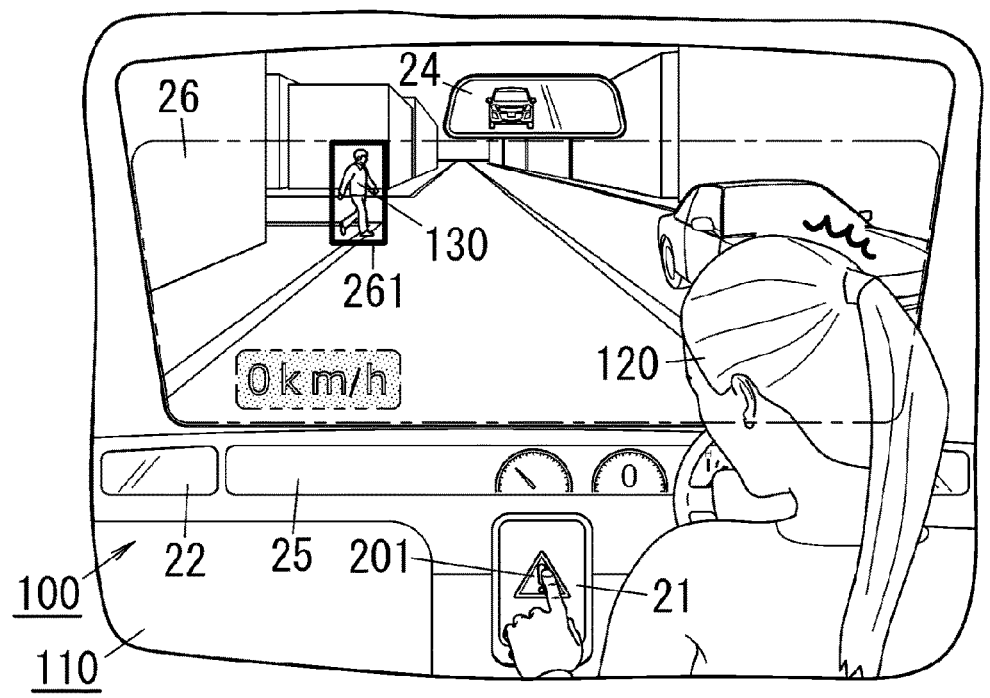

Then, as shown in FIG. 2B, if pedestrian 130 comes ahead of movable-body apparatus 100, display control system 1 causes display device 26 to display virtual image 261 of a frame-like pattern that boxes pedestrian 130. At that time, display control system 1 causes display device 21 to cooperate with display device 26, thereby causing display device 21 to display icon 201 thereon which is to urge driver 120 to pay attention. Thus, in the state shown in FIG. 2B, driver 120 being currently looking at display device 21 can notice that something has taken place.

Figure 2C:
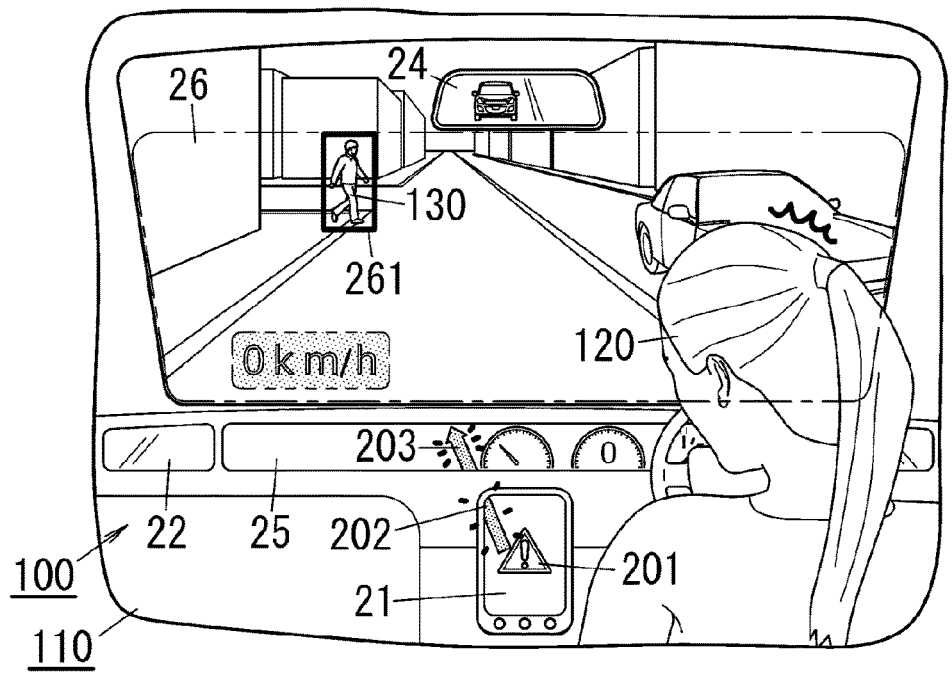
Figure 2D:
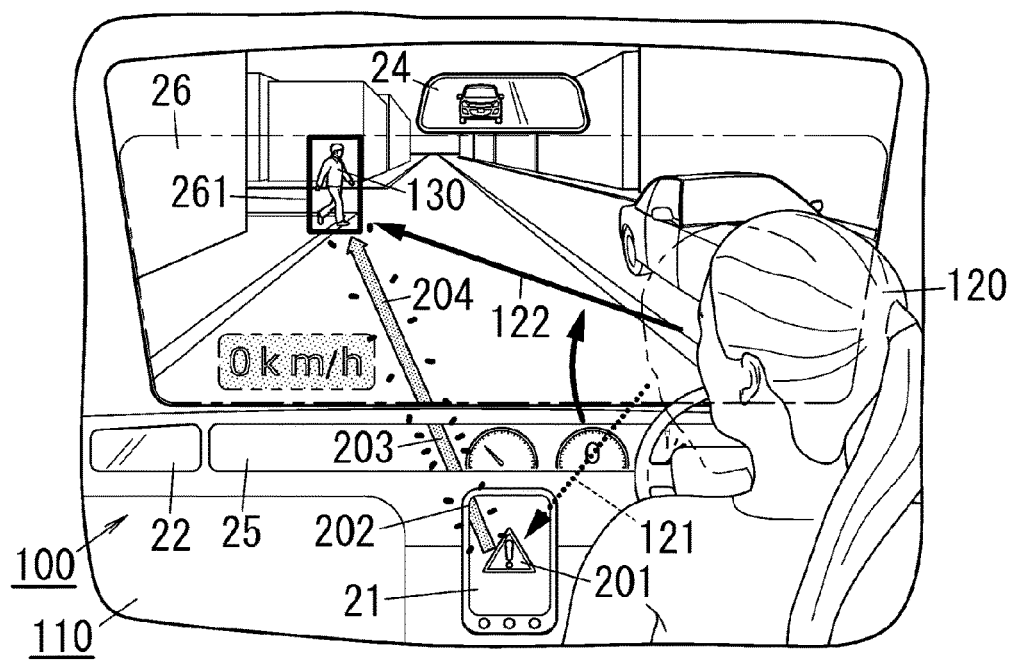

After that, as shown in FIG. 2C, display control system 1 causes display devices 21 and 25 to cooperate with display device 26 to display icons 202 and 203 on display devices 21 and 25, respectively. Icons 202 and 203 are intended to guide the line of sight of driver 120. Furthermore, as shown in FIG. 2D, display control system 1 causes display device 26 to display icon 204 thereon. Icon 204 is also intended to guide the line of sight of driver 120. Icons 202, 203, and 204 collectively configure an image of a light stripe (an arrow image) that extends, when viewed from driver 120, from icon 201 displayed on display device 21 toward virtual image 261 displayed via display device 26. Note that the arrow images shown in FIGS. 2C and 2D is nothing more than an example; therefore, these icons may simply be lines, dashed lines, character strings, or the like, for example.

In the states shown in FIGS. 2C and 2D, line-of-sight 121 of driver 120 is guided to virtual image 261 displayed via display device 26. Accordingly, as shown in FIG. 2D, line-of-sight 121 of driver 120 is directed toward pedestrian 130 ahead of movable-body apparatus 100.

As described above, display control system 1 is capable of causing display devices 21 to 26 to display a single piece of information on and across the display devices. That is, in the case shown in FIGS. 2A to 2D, icons 201 to 204 are displayed as a single piece of information on and across display devices 21, 25, and 26. Icons 201 to 204 are intended to guide line-of-sight 121 of driver 120 toward virtual image 261.

2. Configuration

Figure 3:
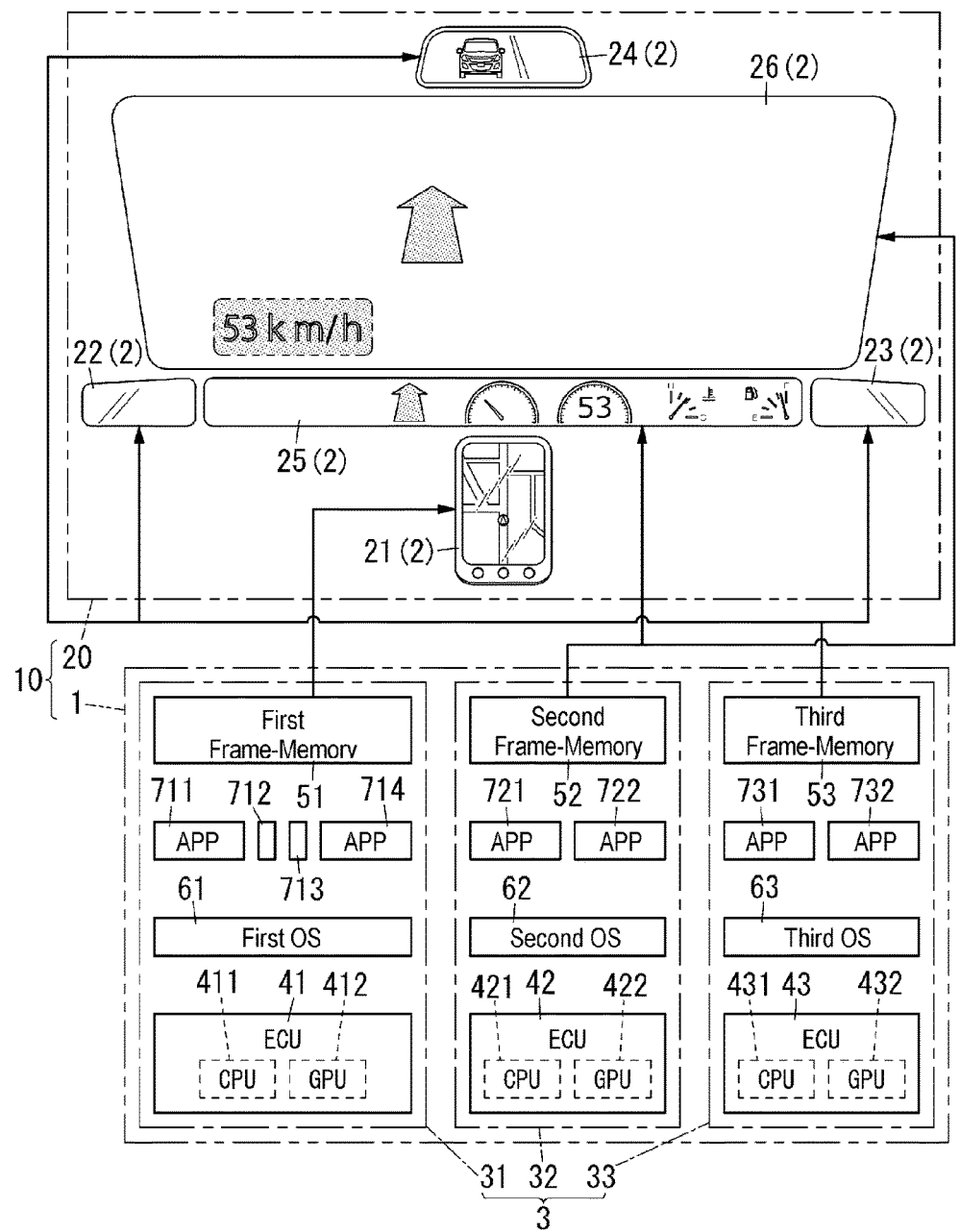
FIG. 3 is a schematic view showing a basic configuration of: the display control system according to the first embodiment of the present disclosure, and a display system that includes the display control system.
Figure 5:
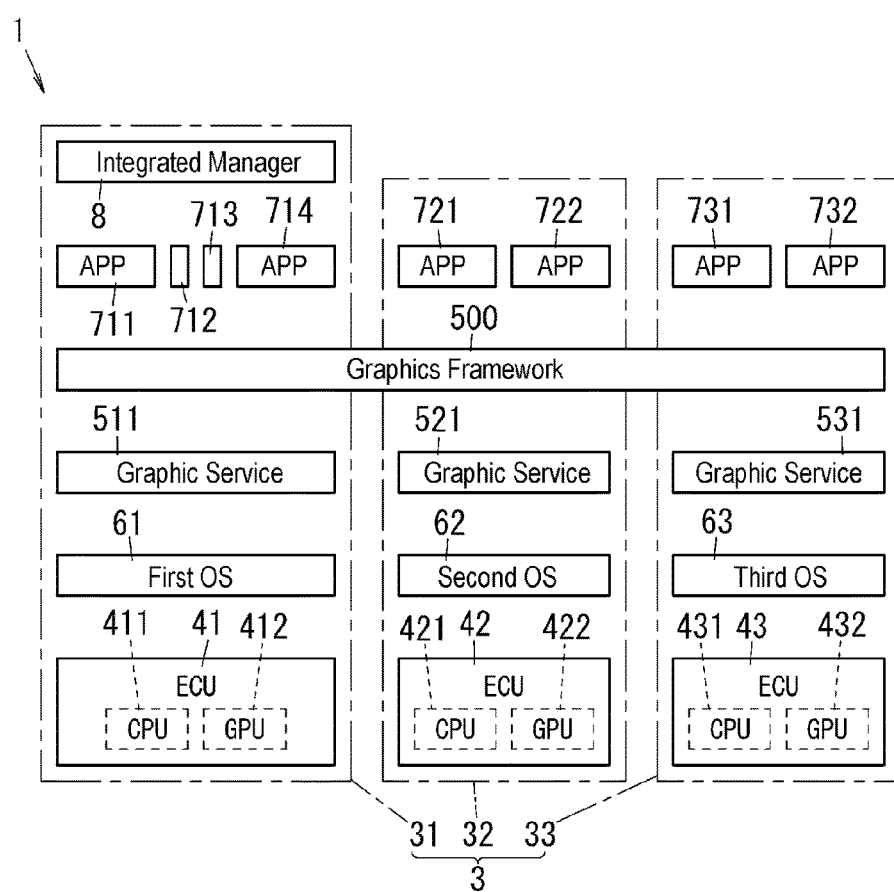
FIG. 5 is yet another schematic view showing the configuration of the display control system according to the first embodiment of the present disclosure.

Hereinafter, descriptions will be made in detail regarding configurations of display control system 1 and display system 10 that includes display control system 1, with reference to FIGS. 3 to 5. In FIGS. 3 to 5, application software is abbreviated as "APP."

As shown in FIG. 4, display control system 1 includes display controller 3, and single virtual frame-memory 50. As described above, display controller 3 controls display devices 21 to 26 which are physically separated from each other. Virtual frame-memory 50 stores one or more screen images to be displayed on display devices 21 to 26. Display controller 3 is configured to write, into virtual frame-memory 50, the screen image to be displayed on and across display devices 21 to 26. Virtual frame-memory 50 is a virtual memory set by an operating system (OS) and the like such that one or more physical memories (non-temporary storage media) provide a continuous storage region.

As shown in FIG. 3, display control system 1 includes, as a basic configuration, first controller 31, second controller 32, and third controller 33. Then, first controller 31, second controller 32, and third controller 33 collectively configure display controller 3. That is, display controller 3 includes first controller 31, second controller 32, and third controller 33 that are physically separated from each other. Each of first controller 31, second controller 32, and third controller 33 includes a computer system, as a major constituent, which includes a processor and a memory. Functions of each of first controller 31, second controller 32, and third controller 33 are implemented through execution of programs by a corresponding one of the computer systems. Such programs are recorded in the memories of the respective computer systems. Such programs may have been recorded in advance in the memories or, alternatively, may be provided via a telecommunication line such as the Internet or via a non-temporary storage medium such as a disc memory or a memory card, in which the programs have been recorded.

First controller 31, second controller 32, and third controller 33 include electronic control units (ECUs) 41, 42, and 43 which are hardware, as their major constituents, respectively. ECU 41 of first controller 31 includes central processing unit (CPU) 411, and graphics processing unit (GPU) 412. Likewise, ECU 42 of second controller 32 includes CPU 421 and GPU 422. ECU 43 of third controller 33 includes CPU 431 and GPU 432. Each of GPU 412, GPU 422, and GPU 432 performs drawing arithmetic processing based on Open Graphics Library (OpenGL), for example.

Moreover, first controller 31, second controller 32, and third controller 33 include frame-memory 51, frame-memory 52, and frame-memory 53, respectively. In the figure, frame memories 51, 52, and 53 are illustrated on the outside of ECUs 41, 42, and 43 for the sake of illustration; however, these memories are, as hardware, included in ECUs 41, 42, and 43, respectively. The "frame-memory" is a memory (frame buffer) that stores a display content (display state) of a screen image (of one frame) which is to be displayed on a corresponding one of display devices 21 to 26. Each of frame memories 51, 52, and 53 may be disposed for the exclusive use or, alternatively, may be configured with a partial region in the memory of the computer system.

In other words, in a case where display devices 21 to 26 are classified into a plurality of groups, display controller 3 includes a plurality of the processors (e.g. GPUs 412, 422, and 432) that has a one-to-one correspondence with the plurality of the groups. In addition, display controller 3 includes a plurality of frame memories 51, 52, and 53 that has a one-to-one correspondence with the plurality of the processors (GPUs 412, 422, and 432) and that configures virtual frame-memory 50 together. In the embodiment, display devices 21 to 26 are classified into three groups, i.e. a first to a third group, as an example. Display device 21 belongs to the first group; display devices 25 and 26 belong to the second group; display devices 22 to 24 belong to the third group. Then, GPU 412 of first controller 31 corresponds to the first group and first frame-memory 51; GPU 422 of second controller 32 corresponds to the second group and second frame-memory 52; GPU 432 of third controller 33 corresponds to the third group and third frame-memory 53.

Here, each of the plurality of the processors (GPUs 412, 422, and 432) is configured to write, in response to a drawing command, a screen image into a corresponding one of frame memories 51 to 53. Such a screen image is to be displayed on any of display devices 2 that belong to the corresponding group. Thus, each of the plurality of the processors is configured to generate the screen image to be displayed on any of display devices 2 that belongs to the corresponding group. Such a "drawing command" is a command (instruction) that causes GPUs 412, 422, and 432 to draw the screen images into the frame memories, that is, to execute the image-writing into these frame memories. For example, GPU 412 of first controller 31 executes the drawing command to write, into first frame-memory 51, a screen image to be displayed on display device 21 that belongs to the first group. GPU 422 of second controller 32 executes the drawing command to write, into second frame-memory 52, a screen image to be displayed on at least one of display devices 25 and 26 that belong to the second group. GPU 432 of third controller 33 executes the drawing command to write, into third frame-memory 53, a screen image to be displayed on at least one of display devices 22 to 24 that belong to the third group.

In the embodiment, for example, ECU 41 is such that CPU 411, GPU 412, and first frame-memory 51 are interconnected via bus connection. When GPU 412 is going to cause display device 21 to display a certain screen image thereon, GPU 412 rewrites the content of first frame-memory 51, and transmits the thus-rewritten content of first frame-memory 51 to display device 21 at a predetermined timing, thereby updating the display content displayed on display device 21. Each of ECUs 42 and 43 is provided with the same configuration as that of ECU 41. Moreover, ECU 41 of first controller 31, ECU 42 of second controller 32, and ECU 43 of third controller 33 are configured to be capable of communicating with each other via a means of communication in conformity with Ethernet (registered trademark), for example. However, the configuration is not limited to this. ECU 41 of first controller 31, ECU 42 of second controller 32, and ECU 43 of third controller 33 may communicate with each other via another means of communication such as Controller Area Network (CAN), for example.

FIG. 3 schematically shows a configuration in which an OS operates on hardware and in which application software operates on the OS. Such a configuration is conceptually illustrated by dividing it into layers, i.e. a hardware layer, an OS layer, and an application layer. For example, in first controller 31, first OS 61 operates on ECU 41 that is hardware, and application software 711 to 714 operate on first OS 61. In second controller 32, second OS 62 operates on ECU 42 that is hardware, and application software 721 and 722 operate on second OS 62. In third controller 33, third OS 63 operates on ECU 43 that is hardware, and application software 731 and 732 operate on third OS 63.

Moreover, display devices 21 to 26 configure display apparatus group 20. Display control system 1 can control display devices 21 to 26 included in display apparatus group 20, thereby causing display devices 21 to 26 to individually display screen images or, alternatively, to display a screen image that spreads across at least two of display devices 2. Display control system 1, together with display apparatus group 20 (display devices 21 to 26), configures display system 10.

Display control system 1, adopting the basic configuration described above, runs a plurality pieces of software (computer programs), thereby implementing the configuration that includes virtual frame-memory 50 as shown in FIG. 4.

Virtual frame-memory 50 is constructed on OSs 61 to 63 of ECUs 41 to 43, through use of frame memories 51 to 53. Virtual frame-memory 50 stores one or more screen images to be displayed on display devices 21 to 26. Display controller 3 is configured to write, into virtual frame-memory 50, a screen image to be displayed on and across display devices 21 to 26. That is, virtual frame-memory 50 can be uniformly accessed from every one of display devices 21 to 26 and GPUs 412, 422, and 432. This is different from frame memories 51 to 53 in that access to frame memories 51 to 53 is allowed only from specified ones among display devices 2, and GPUs 412, 422, and 432. With this configuration, the screen image written in virtual frame-memory 50 can be displayed on and across display devices 21 to 26.

FIG. 4 schematically shows a configuration in which an OS operates on hardware and in which application software operates on the OS. Such a configuration is conceptually illustrated by dividing it into layers, i.e. a hardware layer, an OS layer, and an application layer. Moreover, in FIG. 4, in place of frame memories 51 to 53, virtual frame-memory 50 is illustrated so as to be constructed on OSs 61 to 63 of ECUs 41 to 43.

As shown in FIG. 4, display control system 1 includes virtual frame-memory 50, so that it is possible to perform drawing arithmetic processing seamlessly across first controller 31, second controller 32, and third controller 33. For example, application software 721 installed in second controller 32 can draw images not only on display devices 25 and 26 which belong to the second group, but also directly on display device 21, which belongs to the first group, via virtual frame-memory 50. In FIG. 4, dashed-line arrows conceptually illustrate the case where application software 721 draws the images on display devices 2 via virtual frame-memory 50.

In contrast, in a case where virtual frame-memory 50 is absent, that is, where the configuration is equivalent to the basic configuration as it is shown in FIG. 3, application software 711 to 714 installed in first controller 31 are unable to directly cause display devices 22 to 26 other than display device 21 to display any image. That is, without virtual frame-memory 50, each of the plurality of the processors (GPUs 412, 422, and 432) is allowed to write an image only into a corresponding one of frame memories 51 to 53. This means that the processor concerned is allowed to directly cause the image to be displayed only on display devices 2 that belong to the group corresponding to the processor. For this reason, for example, when using application software 711 installed in first controller 31, it is possible to control (generate) a screen image that is to be directly displayed only on display device 21 that belongs to the first group. When using application software 711 installed in first controller 31, in order to display a screen image on display device 25 or 26 that belongs to the second group, it is necessary to cause the application software to cooperate with and to be in synchronization with application software 721 or 722 installed in second controller 32. Therefore, in order to display a screen image on and across a plurality of display devices 2 that belong different groups, cooperation and synchronization are essential among pieces of the corresponding application software. Unfortunately, it is not easy to develop such application software which can be subjected to the cooperation and synchronization among pieces of the application software installed in different ECUs 41 to 43.

On the other hand, display control system 1 includes virtual frame-memory 50 that can be accessed uniformly from every one of GPUs 412, 422, and 432, thereby the need for such cooperation and synchronization among the pieces of the application software is eliminated. That is, even in a case where a screen image is displayed on and across a plurality of display devices 2 that belong different groups, display control system 1 eliminates the need for such cooperation and synchronization among the pieces of the application software, resulting in ease of development of the application software.

Moreover, FIG. 5 is a more schematic view showing the configuration of display control system 1 according to the embodiment. FIG. 5 shows the configuration in which the OS operates on the hardware and in which both graphic services and the application software operate on the OS. Such a configuration is conceptually illustrated by dividing it into layers, i.e. a hardware layer, an OS layer, a drawing layer, and an application layer. Graphics framework 500 shown between the application layer and the drawing layer configured with graphic services 511, 521, and 531, is a processing step to configure virtual frame-memory 50. Graphics framework 500 is a framework (Seamless Graphics Framework) that is seamlessly executed by a plurality of the processors (GPUs 412, 422, and 432).

In the case shown in FIG. 5, display controller 3 further includes integrated manager 8. Integrated manager 8 manages a correspondence relation between the plurality of the processors (GPUs 412, 422, and 432) and a plurality of drawing regions R1 to R3 (see FIG. 6). That is, in virtual frame-memory 50, the plurality of drawing regions R1 to R3 are set to have a one-to-one correspondence with the plurality of the processors (GPUs 412, 422, and 432). Integrated manager 8 manages region information that is the correspondence relation between the plurality of drawing regions R1 to R3 and the plurality of the processors (GPUs 412, 422, and 432). That is, the substance of virtual frame-memory 50 is the plurality of frame memories 51 to 53 that has the one-to-one correspondence with the plurality of the processors (GPUs 412, 422, and 432); therefore, the plurality of drawing regions R1 to R3 is set in virtual frame-memory 50. In the embodiment, integrated manager 8 is included in first controller 31, as an example.

3. Operation

Hereinafter, descriptions will be made regarding operations of display control system 1 and display system 10 that includes the display control system, with reference to FIGS. 6 and 7.

Figure 6:
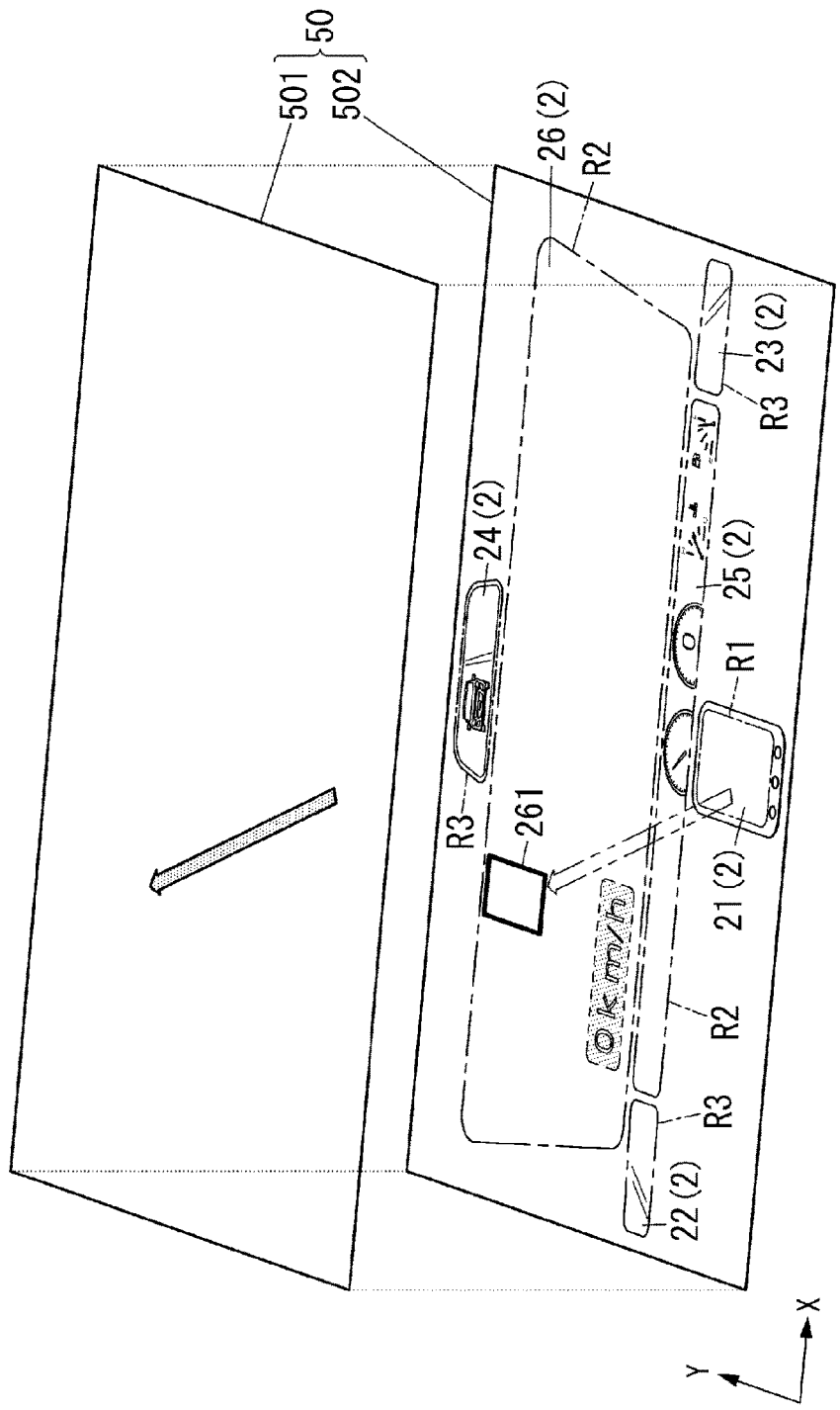
FIG. 6 is a schematic view of a structure of a virtual frame-memory of the display control system according to the first embodiment of the present disclosure.
Figure 7:
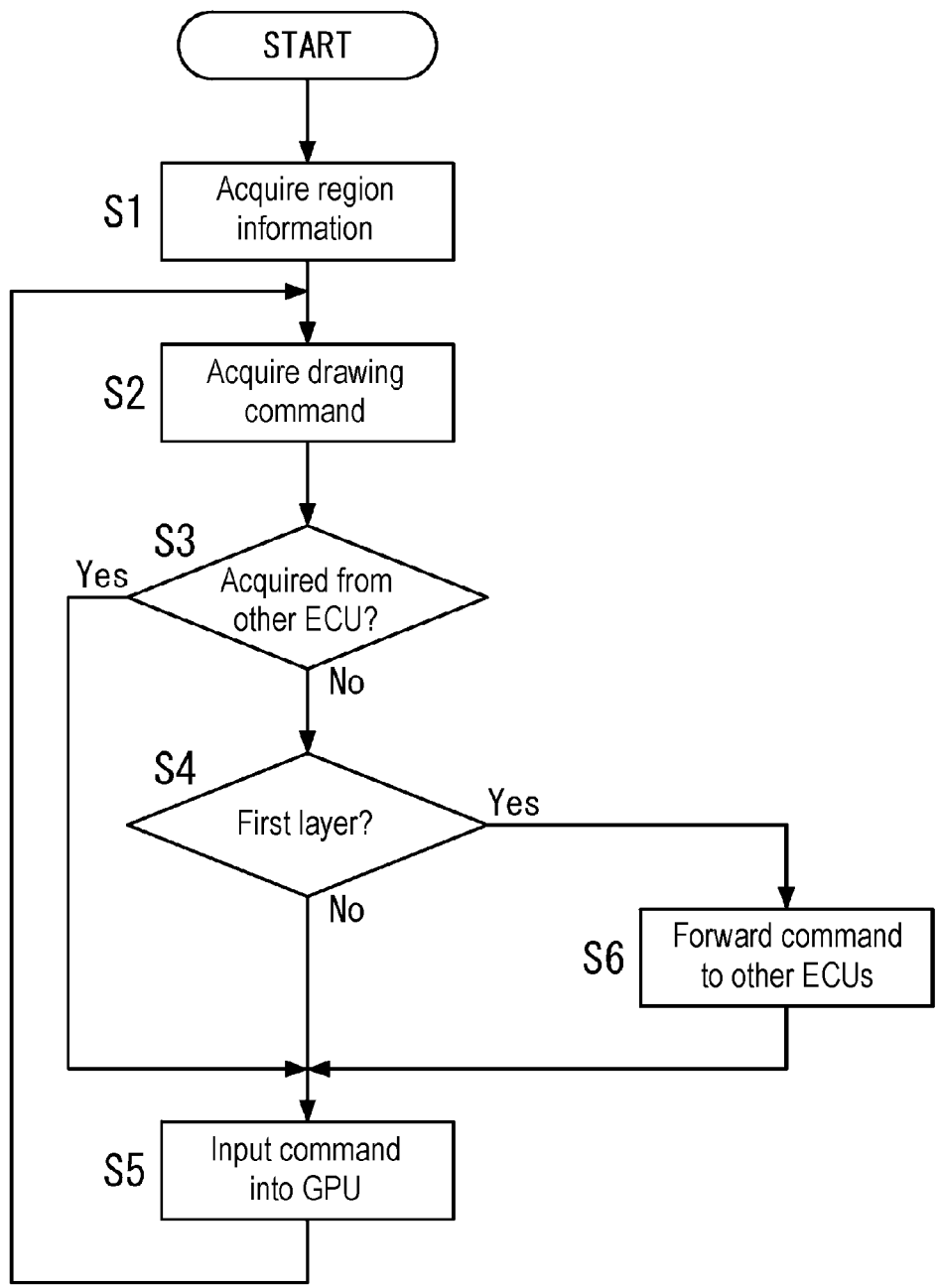
FIG. 7 is a flowchart of operations of the display control system according to the first embodiment of the present disclosure.

FIG. 6 schematically shows a structure of virtual frame-memory 50. That is, virtual frame-memory 50 includes first layer 501 and second layer 502. That is, virtual frame-memory 50 has a multilayer structure (two layers in this case). First layer 501 is a layer in which a screen image to be displayed on and across display devices 21 to 26 is drawn. However, it is not always required that the screen image to be drawn in first layer 501 be displayed on and across all of display devices 21 to 26. Such a screen image may be displayed on and across two or more of display devices 2 that belong to different groups. Second layer 502 is a layer that is used to draw screen images to be individually displayed on display devices 21 to 26. However, such screen images drawn in second layer 502 are required not to be displayed on and across two or more display devices that belong to different groups. The screen images may be displayed on and across two or more display devices (e.g. display devices 24 and 25) that belong to the same group.

First layer 501 and second layer 502 are assigned with degrees of priority. In the embodiment, the degree of priority assigned to first layer 501 is "high," while the degree of priority assigned to second layer 502 is "normal." On the other hand, degrees of priority are assigned also to the drawing commands which are acquired by the plurality of the processors (GPUs 412, 422, and 432). The drawing command assigned with a "high" degree of priority is executed to draw an image in first layer 501. The drawing command assigned with a "normal" degree of priority is executed to draw an image in second layer 502.

Operations of display controller 3 for implementing the drawing into virtual frame-memory 50 described above will be described with reference to the flowchart shown in FIG. 7. The operations are performed as operations of graphics framework 500 shown in FIG. 5. FIG. 7 shows an operation of any one of first controller 31, second controller 32, and third controller 33 (ECUs 41, 42, and 43). Here, as an example, the operation of ECU 42 (second controller 32) when application software 721 is being executed is described. That is, in the case shown in FIG. 7, GPU 422 is the active processor.

Upon startup of application software 721 to start graphics framework 500, ECU 42 first acquires region information from integrated manager 8 (Step S1). Then, ECU 42 acquires a drawing command (Step S2) and determines whether or not the supplier of the drawing command is one of ECU 41 and 43 other than ECU 42 (Step S3). When ECU 42 determines that the supplier of the drawing command is application software 721 of ECU 42 itself (No, in Step S3), ECU 42 determines whether or not the to-be-drawn layer is first layer 501 of virtual frame-memory 50, from the drawing command (Step S4). That is, ECU 42 determines the degree of priority of the drawing command. When the degree of priority is determined to be "high," ECU 42 determines that the to-be-drawn layer is first layer 501 of virtual frame-memory 50 (Yes, in Step S4). When the degree of priority is determined to be "normal," ECU 42 determines that the to-be-drawn layer is second layer 502 of virtual frame-memory 50 (No, in Step S4).

When the to-be-drawn layer is determined to be second layer 502 of virtual frame-memory 50 (No, in Step S4), ECU 42 inputs the drawing command into GPU 422 (Step S5). That is, in response to the drawing command, GPU 422 writes drawing data into second frame-memory 52 that is the corresponding one among frame memories 51 to 53. With this operation, GPU 422 executes drawing processing for drawing region R2 that is the corresponding one of the regions in second layer 502 of virtual frame-memory 50.

On the other hand, when the to-be-drawn layer is determined to be first layer 501 of virtual frame-memory 50 (Yes, in Step S4), ECU 42 forwards the drawing command to other ECUs 41 and 43 (Step S6), and then inputs the drawing command into GPU 422 (Step S5). At that time, ECU 42 transmits the drawing command by broadcast, thereby forwarding the drawing command to ECUs 41 and 43 all at once.

ECUs 41 and 43, to which the drawing command is forwarded, determines that the supplier of the drawing command is ECU 42 that is another ECU as viewed from ECUs 41 and 43 concerned (Yes, in Step S3). Therefore, ECUs 41 and 43 input the command into GPUs 412 and 432, respectively, without further forwarding the drawing command (Step S5). In this way, the ECUs (ECUs 41 and 43) that have received the drawing command forwarded from another ECU (ECU 42) executes the same drawing processing as in Step S5, without performing any determination processing such as Step S4. However, for example, the drawing processing for a region in first layer 501 of virtual frame-memory 50, corresponding to drawing region R3 of second layer 502, is actually performed only by GPU 432 that corresponds to drawing region R3, so that the drawing processing is not performed by GPU 412 because of the absence of coordinates at which data are to be written.

After Step S5, ECU 42 returns to the processing (Step S2) of acquiring a drawing command. ECU 42 repeatedly performs the processing in Steps S2 to S6 as long as application software 721 continues the operation.

As described above, the active processor among the plurality of the processors (GPUs 412, 422, and 432) forwards the drawing command to all of the processors excluding the active processor, thereby sharing the drawing command among all the processors. With this operation, each of the plurality of the processors (GPUs 412, 422, and 432) causes the plurality of frame memories 51 to 53 to function as virtual frame-memory 50. Moreover, each of the plurality of the processors (GPUs 412, 422, and 432) is configured to determine, depending on the degree of priority of the drawing command, whether or not to forward the drawing command. That is, each of the plurality of the processors (GPUs 412, 422, and 432) forward only the drawing command that has the "high" degree of priority by which screen images to be displayed on and across display devices 21 to 26 are drawn. For this reason, this operation can reduce an increase in communication traffic caused by forwarding drawing commands, in comparison with a case where every drawing command is forwarded even with a "normal" degree of priority, without any selection in terms of priority;

such a "normal" drawing command is to be executed for drawing screen images individually on display devices 21 to 26.

4. Modified Examples

The first embodiment is nothing more than an example of various embodiments of the present disclosure. Therefore, the first embodiment may be subjected to various modifications in accordance with designing and the like as long as a modified embodiment can achieve an object of the present disclosure. Moreover, the same functions as those of display control system 1 may be implemented through use of a display controlling method, a computer program, a storage medium that has recorded a computer program, or the like. The display controlling method according to the first embodiment is a method of controlling display devices 21 to 26 that are physically separated from each other. In accordance with the display controlling method, a screen image to be displayed on and across display devices 21 to 26 is written into a single virtual frame-memory 50 for storing one or more screen images to be displayed on display devices 21 to 26. The (computer) program according to the first embodiment is a program for causing the computer system to execute the display controlling method described above.

Hereinafter, modified examples of the first embodiment will be described one by one. Note, however, that the modified examples described below may be optionally combined to produce another applicable configuration.

Display control system 1 includes the computer systems in display controller 3 or the like, for example. Each of the computer systems includes the processor and memory which are hardware as main components. The processor executes the program recorded in the memory of the computer system, thereby implementing the functions of display control system 1. The program may have been recorded in advance in the memory or, alternatively, may be provided via a telecommunication line or via a non-temporary storage medium in which the program has been recorded. Such a storage medium is a memory card, an optical disk, a hard disk drive which are readable with the computer system, or the like. The processor of the computer system is configured with one or more electronic circuits that include an integrated circuit (IC) or a large-scale integrated circuit (LSI). A plurality of the electronic circuits may be integrated in a one-piece chip, or may be divided and separately disposed in a plurality of chips. The plurality of the chips may be combined in one apparatus or, alternatively, may be separately disposed in a plurality of apparatuses.

Moreover, it is not essential configuration of display control system 1 that the plurality of the functions of display control system 1 is centralized in one housing. The constituent elements of display control system 1 may be decentralized and disposed in a plurality of housings. Moreover, at least a part of the functions of display control system 1 may be implemented through cloud computing and the like, for example. Besides this, in the first embodiment, even in cases where display control system 1 is decentralized and disposed in the plurality of the apparatuses, at least a part of the functions of such a display control system may be centralized in one housing.

Moreover, movable-body apparatus 100 to which display devices 21 to 26 are mounted is not limited to an automobile (four-wheeled vehicle) that travels on road surfaces. The movable-body apparatus may be a two-wheeled vehicle, electric train, aircraft, drone, construction equipment, vessel, or the like, for example. Moreover, movable-body apparatus 100 may be operated by automated driving without driver 120. In this case, display control system 1 or display system 10 displays images to show them to a passenger, being not a driver, of movable-body apparatus 100.

Moreover, display devices 2 are not limited to display apparatuses set in equipment such as a car navigation system, electronic mirror system, multi-information display, or head-up display. The display devices may include headlights, taillights, hazard warning lights, and direction indicators, for example.

Moreover, display control system 1 may not be mounted to movable-body apparatus 100. In this case, display devices 21 to 26 mounted to movable-body apparatus 100 may be controlled by display control system 1 from the outside of movable-body apparatus 100. That is, display control system 1 can control display devices 21 to 26 mounted to movable-body apparatus 100, through communication between movable-body apparatus 100 and a peripheral vehicle or infrastructure, via a vehicle-to-everything (V2X) communication network, for example. Moreover, a plurality of movable-body apparatuses 100 can cooperate with each other to control the plurality of display devices 21 to 26 that is mounted to single movable-body apparatus 100.

Moreover, in the first embodiment, integrated manager 8 is included in first controller 31; however, the configuration is not limited to this. Integrated manager 8 may be included in second controller 32 or third controller 33 or, alternatively, may be disposed separately from first controller 31, second controller 32, and third controller 33.

Moreover, display devices 21 to 26, serving as objects to be controlled by display control system 1, are not limited to the configuration in which they are mounted in movable-body apparatus 100. For example, display devices 21 to 26 may be disposed in indoor or outdoor facilities and the like. In this case, display devices 21 to 26 serve as digital signages, electronic message boards, or the like, for example.

Moreover, in the first embodiment, the description has been made using the case that involves six of the display devices, three of the ECUs (each including a CPU and a GPU), and three of the frame memories; however, the numbers of these units are nothing more than an example. For example, the configuration may include either five or less of the display devices or seven or more of the display devices.

Second Exemplary Embodiment

A display control system according to a second embodiment has the same configuration as display control system 1 according to the first embodiment shown in FIGS. 3 to 5 except that an operation (graphics framework 500 in FIG. 5) for drawing an image into virtual frame-memory 50 shown in FIG. 4 by display controller 3 is different from that in the first embodiment. Hereinafter, the same configurations as those according to the first embodiment are designated by the same numerals and symbols as in the first embodiment, and their duplicate explanations are omitted.

In the first embodiment, virtual frame-memory 50 has the multilayer structure that includes first layer 501 and second layer 502, as described referring to FIG. 6. On the other hand, in the embodiment, virtual frame-memory 50 has a monolayer structure. Accordingly, no priority is assigned to drawing commands.

Figure 8:
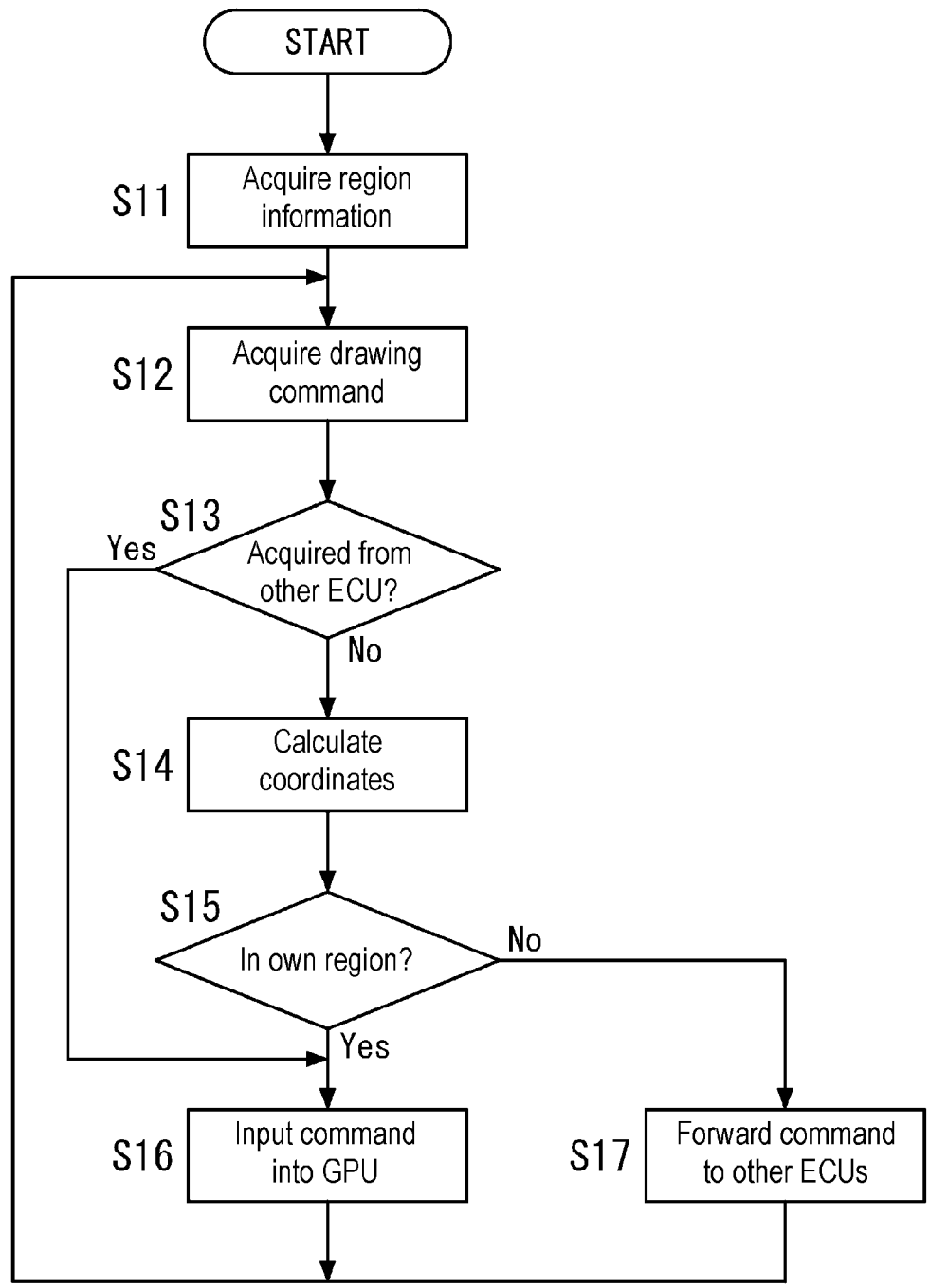
FIG. 8 is a flowchart of operations of a display control system according to a second embodiment of the present disclosure.

In the embodiment, display controller 3 operates in accordance with the flowchart shown in FIG. 8. The flowchart shown in FIG. 8 indicates an operation of any one of first controller 31, second controller 32, and third controller 33 (ECUs 41, 42, and 43). Here, as an example, the operation of ECU 42 (second controller 32) when application software 721 is being executed is described. That is, in the case shown in FIG. 8, GPU 422 is the active processor.

Upon startup of application software 721 to start graphics framework 500, ECU 42 first acquires region information from integrated manager 8 (Step S11). In this case, the thus-acquired region information contains not only a correspondence relation between GPU 422 of ECU 42 and drawing region R2, but also a correspondence relation between GPUs 412 and 432 of ECUs 41 and 43 and drawing regions R1 and R3, respectively. After that, ECU 42 acquires a drawing command (Step S12) and determines whether or not the supplier of the drawing command is one of ECU 41 and 43 other than ECU 42 (Step S13). When ECU 42 determines that the supplier of the drawing command is application software 721 of ECU 42 itself (No, in Step S13), ECU 42 calculates coordinates in virtual frame-memory 50 from the drawing command (Step S14). The resulting "coordinates" are set in virtual frame-memory 50 into which GPU 412 performs drawing.

After that, ECU 42 determines the correspondence relation between the coordinates thus-determined by calculation and drawing region R2 corresponding to the ECU itself (Step S15). That is, ECU 42 determines whether or not the to-be-written coordinates designated by the drawing command are included in drawing region R2 that corresponds to GPU 422. When ECU 42 determines that the determined coordinates corresponds to drawing region R2 of ECU 42 itself, i.e. the determined coordinates is included in drawing region R2 (Yes, in Step S15), ECU 42 inputs the drawing command into GPU 422 (Step S16). In response to the drawing command, GPU 422 writes the drawing data into second frame-memory 52 that is a corresponding one of frame memories 51 to 53. With this operation, GPU 422 performs the drawing processing into drawing region R2 that is a corresponding one of the drawing regions in virtual frame-memory 50.

On the other hand, when ECU 42 determines that the determined coordinates does not correspond to drawing region R2 of ECU 42 itself, i.e. the determined coordinates is not included in drawing region R2 (No, in Step S15), ECU 42 forwards the drawing command to ECU 41 or 43 that is other than ECU 42 (Step S17). At that time, ECU 42 identifies drawing region R1 or R3 that includes the determined coordinates, and then transmits the drawing command, by unicast, to ECU 41 or 43 which includes the processor (GPU 412 or 432) corresponding to the thus-identified drawing region R1 or R3, respectively.

ECU 41 or 43, to which the drawing command is forwarded, determines that the supplier of the drawing command is ECU 42 (Yes, in Step S13). Therefore, ECU 41 or 43 inputs the drawing command into GPU 412 or 432, respectively, without further forwarding the drawing command (Step S16). In short, the ECU (ECU 41 or 43) that has received the drawing command forwarded from another ECU (ECU 42) executes the same drawing processing as in Step S16, without performing determination processing such as Step S15.

After Step S16, ECU 42 returns to the processing (Step S12) of acquiring a drawing command. Moreover, when forwarding the drawing command to ECU 41 or 43 (Step S17), ECU 42 returns to the processing of acquiring a drawing command (Step S12), without inputting the drawing command into GPU 422 (Step S16). ECU 42 repeatedly performs the processing from Step S12 to Step S17 as long as application software 721 continues the operation.

In this way, in virtual frame-memory 50, a plurality of drawing regions R1 to R3 is set to have a one-to-one correspondence with the plurality of the processors (GPUs 412, 422, and 432), respectively. Each of the plurality of the processors (GPUs 412, 422, and 432) determines whether or not the drawing position (coordinates), which is designated in virtual frame-memory 50 by the drawing command, belongs to a corresponding drawing region among the plurality of drawing regions R1 to R3. When each of the plurality of the processors (GPUs 412, 422, and 432) determines that the drawing position does not belong to the corresponding drawing region, the processor forwards (transmits) the drawing command to at least one of the other processors, i.e. the plurality of the processors (GPUs 412, 422, and 432) excluding the processor itself. With this operation, each of the plurality of the processors (GPUs 412, 422, and 432) causes the plurality of frame memories 51 to 53 to function as virtual frame-memory 50.

That is, in the case described above, the plurality of the processors includes GPU 422 that serves as the active processor. Then, GPU 422 forwards (transmits) the drawing command to at least one of GPUs 412 and 432 when the drawing position designated in virtual frame-memory 50 by the drawing command does not belong to drawing region R2 that is the corresponding one among the plurality of drawing regions R1 to R3. This operation causes frame memories 51 and 53 to function as a part of virtual frame-memory 50.

The configuration described in the second embodiment may be optionally combined with any of the various configurations (including the modified examples) described in the first embodiment so as to produce another applicable configuration.

SUMMARY

As described above, display control system 1 according to the various embodiments of the present disclosure includes display controller 3, and single virtual frame-memory 50. Display controller 3 controls display devices 21 to 26 physically separated from each other. Virtual frame-memory 50 stores one or more screen images to be displayed on display devices 21 to 26. Display controller 3 is configured to write, into virtual frame-memory 50, a screen image that is to be displayed on and across at least two of display devices 21 to 26.

In accordance with the configuration, display controller 3 writes, into virtual frame-memory 50, a screen image that is to be displayed on and across at least two of display devices 21 to 26, thereby allowing a single piece of information to be displayed on and across display devices 21 to 26. That is, display control system 1 performs centralized control of display devices 21 to 26 which are physically separated from each other, thereby allowing display devices 21 to 26 to cooperate with each other to display the single piece of information.

Display devices 21 to 26 may be mounted on single movable-body apparatus 100.

In accordance to the configuration, it is possible to cause display devices 21 to 26 of apparatuses, which are mounted in movable-body apparatus 100, to cooperate with each other to display a single piece of information. Examples of the apparatuses include a car navigation system, electronic mirror system, multi-information display, and head-up display.

Display control system 1 may be configured such that display controller 3 can further write, into virtual frame-memory 50, screen images to be individually displayed on display devices 21 to 26.

With this configuration, it is possible to use virtual frame-memory 50 to display screen images individually on display devices 21 to 26.

Display devices 21 to 26 are classified into a plurality of the groups. Display controller 3 may include a plurality of the processors (GPUs 412, 422, and 432), and frame memories 51 to 53. GPUs 412, 422, and 432 have a one-to-one correspondence with the plurality of the groups of display devices 21 to 26. Frame memories 51 to 53 have a one-to-one correspondence with GPUs 412, 422, and 432, and configure virtual frame-memory 50. In response to a drawing command, each of GPUs 412, 422, and 432 writes drawing data into a corresponding one of frame memories 51 to 53. That is, GPUs 412, 422, and 432 include an active processor among them. Then, in response to the drawing command, the active processor writes a screen image into a corresponding one of frame memories 51 to 53. The screen image is to be displayed on any display device that belongs to a corresponding group among the plurality of the groups. The active processor may be any one of GPUs 412, 422, and 432. With this configuration, each of GPUs 412, 422, and 432 is configured to be able to generate a screen image to be displayed on any display device, which belongs to the corresponding group, among display devices 21 to 26.

This configuration allows the shared use of the single virtual frame-memory 50 among GPUs 412, 422, and 432, resulting in ease of the cooperation among GPUs 412, 422, and 432.

Each of GPUs 412, 422, and 432 may forward the drawing command to all of the other processors, i.e. GPUs 412, 422, and 432 excluding the processor concerned. Through the shared use of the drawing command among all of the other processors, each of GPUs 412, 422, and 432 can cause frame memories 51 to 53 to function as virtual frame-memory 50. That is, the active processor among GPUs 412, 422, and 432 forwards the drawing command to all of the processors excluding the active processor. Then, the active processor shares the drawing command with all of the processors excluding the active processor, thereby causing frame memories 51 to 53 to function as virtual frame-memory 50.

In accordance with the configuration, virtual frame-memory 50 can be implemented with such a relatively simple configuration in which a drawing command is transmitted among GPUs 412, 422, and 432 to be shared among them.

Each of GPUs 412, 422, and 432 may be configured to determine, depending on the degree of priority of the drawing command, whether to forward or not the drawing command. That is, the active processor among GPUs 412, 422, and 432 determines, depending on the degree of priority of the drawing command, whether to forward or not the drawing command.

This configuration can reduce an increase in communication traffic caused by forwarding drawing commands, in comparison with a case where every drawing command is forwarded without any selection of the commands.

In virtual frame-memory 50, a plurality of drawing regions R1 to R3 may be set which has a one-to-one correspondence with GPUs 412, 422, and 432. In this case, each of GPUs 412, 422, and 432 performs the following forwarding processing when the drawing position in virtual frame-memory 50 designated by the drawing command does not belong to a corresponding drawing region among drawing regions R1 to R3. In the forwarding processing, the drawing command is forwarded to at least one of the other processors, i.e. GPUs 412, 422, and 432 excluding the GPU concerned, thereby causing frame memories 51 to 53 to function as virtual frame-memory 50. That is, the active processor forwards the drawing command to at least one of the processors excluding the active processor when the drawing position in virtual frame-memory 50 designated by the drawing command does not belong to a corresponding drawing region among drawing regions R1 to R3. This causes frame memories 51 to 53 to function as virtual frame-memory 50.

In accordance with the configuration, virtual frame-memory 50 can be implemented with such a relatively simple configuration in which a drawing command is forwarded among GPUs 412, 422, and 432 to be shared among them. On top of that, this configuration can reduce an increase in communication traffic caused by forwarding drawing commands, in comparison with a case where every drawing command is forwarded without any selection of the commands.

Display controller 3 may further include integrated manager 8 which manages the correspondence relation between GPUs 412, 422, and 432 and drawing regions R1 to R3.

This configuration allows centralized management of the correspondence relation between GPUs 412, 422, and 432 and drawing regions R1 to R3, resulting in ease of changing of the correspondence relation and the like.

Display system 10 according to the embodiments of the present disclosure includes display control system 1 with any one of the configurations described above, and display devices 21 to 26.

In accordance with the configuration, display controller 3 writes, into virtual frame-memory 50, a screen image to be displayed on and across at least two of display devices 21 to 26, thereby causing display devices 21 to 26 to display a single piece of information. That is, in accordance with display system 10, display devices 21 to 26 physically separated from each other are centrally controlled, thereby causing display devices 21 to 26 to cooperate with each other to display the single piece of the information.

Movable-body apparatus 100 according to the embodiments includes display system 10, and body 110 to which display system 10 is mounted.

In accordance with the configuration, display controller 3 writes, into virtual frame-memory 50, a screen image to be displayed on and across at least two of display devices 21 to 26, thereby causing display devices 21 to 26 to display a single piece of information. That is, in accordance with movable-body apparatus 100, display devices 21 to 26 physically separated from each other are centrally controlled, thereby causing display devices 21 to 26 to cooperate with each other to display the single piece of the information.

The display controlling method according to the embodiments of the present disclosure is a method for controlling display devices 21 to 26 physically separated from each other. In the display controlling method, a screen image to be displayed on and across display devices 21 to 26 is written into single virtual frame-memory 50 that is for storing one or more screen images to be displayed on display devices 21 to 26.

In accordance with the method, the screen image to be displayed on and across at least two of display devices 21 to 26 is written into virtual frame-memory 50, which allows a single piece of information to be displayed with display devices 21 to 26. That is, in accordance with the display controlling method described above, display devices 21 to 26 physically separated from each other are centrally controlled, thereby causing display devices 21 to 26 to cooperate with each other to display the single piece of the information.

The program according to the embodiment of the present disclosure is a program for causing the computer system to execute the display controlling method described above.

In accordance with the program, the screen image to be displayed on and across at least two of display devices 21 to 26 is written into virtual frame-memory 50, which allows a single piece of information to be displayed with display devices 21 to 26. That is, in accordance with the program described above, display devices 21 to 26 physically separated from each other are centrally controlled, thereby causing display devices 21 to 26 to cooperate with each other to display the single piece of the information.

The implementation of the various configurations (including those of the modified examples) of display control system 1 according to the first and second embodiments is not limited to that described above. These various configurations can be implemented through the display controlling method, the program, and the non-temporary storage medium.

As described above, the display control system according to the present disclosure is capable of performing centralized control of a plurality of display devices. The system is useful in controlling various display devices. In particular, the system is effective in controlling an automotive display device which is intended to provide information to a driver.

What is claimed is:

1. A display control system for assisting a driver in an operation of a single movable-body apparatus, comprising:
   a display controller configured to control a plurality of display devices physically separated from each other; and
   a single virtual frame-memory configured to store one or more screen images to be displayed on the plurality of the display devices,
   wherein the display controller is further configured to write, into the virtual frame-memory, a screen image to be displayed on and across at least two of the plurality of the display devices, the screen image being included the one or more screen images, and
   wherein the screen image includes an icon that continues across the at least two of the plurality of the display devices.

2. The display control system according to claim 1,
   wherein the plurality of the display devices is mounted in the single movable-body apparatus.

3. The display control system according to claim 1,
   wherein the display controller is further configured to further write, into the virtual frame-memory, screen images to be individually displayed on the plurality of the display devices, the screen images being included the one or more screen images.

4. The display control system according to claim 1,
   wherein the plurality of the display devices is classified into a plurality of groups, and
   the display controller includes
      a plurality of processors having a one-to-one correspondence with the plurality of the groups; and
      a plurality of frame memories having a one-to-one correspondence with the plurality of the processors, the plurality of the frame memories configuring the virtual frame-memory, and
   the plurality of the processors includes an active processor, and the active processor writes, in response to a drawing command, a screen image into a corresponding one of the plurality of the frame memories, the screen image being to be displayed on one of the display devices and being included the one or more screen images, the one of the display devices belonging to a corresponding one of the plurality of the groups.

5. The display control system according to claim 4,
   wherein the active processor causes the plurality of the frame memories to function as the virtual frame-memory, by forwarding the drawing command to all of the plurality of the processors excluding the active processor and by sharing the drawing command with the all of the processors excluding the active processor.

6. The display control system according to claim 5,
   wherein the drawing command is assigned with a degree of priority, and
   the active processor determines whether to forward the drawing command, depending on the degree of priority.

7. The display control system according to claim 4,
   wherein, in the virtual frame-memory, a plurality of drawing regions is set to have a one-to-one correspondence with the plurality of the processors,
   the active processor causes the plurality of the frame memories to function as the virtual frame-memory, by forwarding the drawing command to at least one of the plurality of the processors excluding the active processor when a drawing position designated in the virtual frame-memory by the drawing command does not belong to a corresponding one of the plurality of the drawing regions.

8. The display control system according to claim 7,
   wherein the display controller further includes an integrated manager for managing a correspondence relation between the plurality of the processors and the plurality of the drawing regions.

9. A display system, comprising:
   a display control system as set forth in claim 1; and
   the plurality of display devices.

10. A movable-body apparatus, comprising:
    a display system as set forth in claim 9; and
    a body to which the display system is mounted.

11. A display controlling method of controlling a plurality of display devices physically separated from each other for assisting a driver in an operation of a single movable-body apparatus, the method comprising:
    writing, into a single virtual frame-memory, a screen image to be displayed on and across the plurality of the display devices,
    wherein the virtual frame-memory stores one or more screen images to be displayed on the plurality of the display devices and the screen image is included in the one or more screen images, and
    wherein the screen image includes an icon that continues across the at least two of the plurality of the display devices.

12. A non-temporary storage medium storing a program, the program causing a computer system to execute a display controlling method as set forth in claim 11.

* * * * *